(12) United States Patent
Matsumoto et al.

(10) Patent No.: US 6,902,607 B2
(45) Date of Patent: Jun. 7, 2005

(54) ANTHRAPYRIDONE COMPOUND, WATER-BASED MAGENTA INK COMPOSITION, AND METHOD OF INK-JET RECORDING

(75) Inventors: Hiroyuki Matsumoto, Saitama (JP); Katsunori Fujii, Kawaguchi (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/475,719

(22) PCT Filed: Apr. 30, 2002

(86) PCT No.: PCT/JP02/04321

§ 371 (c)(1),
(2), (4) Date: Dec. 31, 2003

(87) PCT Pub. No.: WO02/090441

PCT Pub. Date: Nov. 14, 2002

(65) Prior Publication Data

US 2004/0134383 A1 Jul. 15, 2004

(30) Foreign Application Priority Data

May 9, 2001 (JP) ........................................ 2001-138033

(51) Int. Cl.$^7$ .......................... C09D 11/00; C09D 11/02; C07D 221/18; B41J 2/01
(52) U.S. Cl. ................................ 106/31.47; 106/31.77; 546/76; 347/100
(58) Field of Search ........................... 106/31.47, 31.77; 546/76; 347/100

(56) References Cited

U.S. PATENT DOCUMENTS

| 2,644,821 A | 7/1953 | Albin et al. ............... 546/76 |
| 2,759,939 A | 8/1956 | Bucheler et al. ............ 546/75 |
| 6,460,988 B1 * | 10/2002 | Mafune et al. ............. 347/100 |
| 6,706,100 B2 * | 3/2004 | Mafune et al. ........... 106/31.27 |
| 2002/0011178 A1 * | 1/2002 | Kanke et al. ............ 106/31.47 |

FOREIGN PATENT DOCUMENTS

| EP | 1 063 268 | 12/2000 |
| JP | 2-16171 | 1/1990 |

OTHER PUBLICATIONS

Copy of the International Search Report dated Aug. 13, 2002.
Copy of the European Search Report dated Dec. 21, 2004.
Copy of the Chinese Office Action dated Nov. 26, 2004.

* cited by examiner

Primary Examiner—Helene Klemanski
(74) Attorney, Agent, or Firm—Nields & Lemack

(57) ABSTRACT

The ink composition comprises as its coloring matter component a water-based magenta composition containing anthrapyridone compound represented by the formula (1):

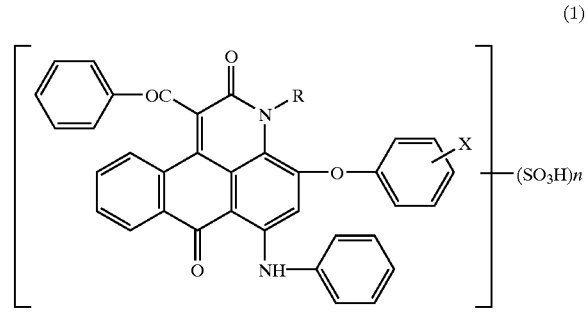

wherein R represents hydrogen atom or methyl group; X represents phenyl group, phenoxy group or halogen atom; and n is an integer of 1 to 4, or salt thereof.

15 Claims, No Drawings

ANTHRAPYRIDONE COMPOUND, WATER-BASED MAGENTA INK COMPOSITION, AND METHOD OF INK-JET RECORDING

FIELD OF THE INVENTION

The present invention relates to a novel sulfonic acid derivative of anthrapyridone compound or its salt, a water-based magenta ink composition for ink-jet recording comprising said compound, and an ink-jet recording method using said composition.

BACKGROUND OF THE INVENTION

As a recording method using an ink-jet printer, various kinds of diverse ink jetting systems have been developed, and for recording in these systems, ink droplets are generated and deposited to various recording materials (paper, film, cloth etc.).

A recording method via an ink-jet printer has characteristics such that no sound is produced since there is no contact between a recording head and a recording material and this method can print on a variety of substrates such as a substrate having uneven surfaces, a substrate comprising a soft material, and a fragile substrate. Recently, ink-jet printers are spread rapidly since it is easy to reduce their size, to print with a high speed and to make color prints. They are expected to be further popularized significantly.

In order to record in color picture or character informations on a color display of a computer via an ink-jet printer, a subtractive mixture method with four inks comprising three primary coloring matters of yellow (Y), magenta (M) and cyan (C) and additionally black (K) is generally adopted. To reproduce a subtractive mixed color image as faithfully as possible by a subtractive mixed color image of red (R), green (G) and blue (B) for CRT displays etc., it is desired that coloring matters used, particularly coloring matters used in YMC inks, have hues as near as possible to standard hues of YMC and are as vivid as possible. And, an ink composition is requested to be stable for a long-period storage and to give prints having a high concentration and excellent in fastnesses such as water resistance, light resistance, and ozone resistance. Prints resulting from recording via an ink-jet printer will be applied for display such as advertisement in order to broaden an application of an ink composition. In such cases, prints will be often exposed to light (an electric lamp, a fluorescent lamp, a sunlight and the like) and an air (containing nitrogen oxide gas, ozone gas and the like). Thus, an ink composition giving printed images excellent in ozone resistance is especially requested. Many images printed on coated papers via an ink-jet printer are faded by ozone. Reason considered is an interaction between an ozone gas in an air and inorganic substances and/or polymers applied on coated papers, but it is not correctly elucidated at present. The present invention relates to a magenta ink among inks having the above hues.

The application of ink-jet printers is broadened from small printers for OA to large printers for industry, and a chance to expose prints outdoors is increasing. Thus, the improvement of fastnesses such as water resistance, light resistance, and ozone resistance is further requested. Among these properties, water resistance is under significant improvement by coating, together with PVA resin, organic or inorganic fine particles (e.g. cationic polymer, porous silica, alumina sol and special ceramics) capable of adsorbing coloring matters in ink, onto the surface of the paper. In practice, such papers have been commercially available as various coated papers for ink-jet printing. However, a technique significantly improving light resistance and ozone resistance has not been established yet. If prints resulting from printing on coated papers called as glossy papers are left in a well ventilated place, they are faded and discolored. In order to resolve this problem, prints are processed by laminating after printing so as to prevent them from fading at present. However, this method has many demerits in time, convenience and cost. To provide a fundamental method for improving the above problem, the development of a magenta dye which is hardly faded is an important problem.

Representative skeletons of a magenta coloring matter used in a water-based ink for ink-jet recording are xanthene as described in JP-A-54089811 (1979), JP-A-08060053 (1996), JP-A-08143798 (1996) and the like; and azo having H acid in its skeleton as described in JP-A-61062562 (1986), JP-A-62156168 (1987), JP-A-03203970 (1991), JP-A-07157698 (1995), JP-B-07078190 (1995) and the like. However, xanthene coloring matter have very poor light resistance although they are very excellent in hue and clarity. While, azo coloring matter having H acids in their skeletons have poor light resistance and clarity although they have good hue and water resistance. As described in JP-A-03203970 (1991), an azo magenta dye excellent in clarity and light resistance has been developed, but its light resistance is still insufficient as compared with dyes having other hues such as a cyan dye, a representative of which is a cupper phthalocyanine dye, a yellow dye and the like. And, prints resulting from printing with these coloring matters on glossy papers may be discolored and faded even if they are left in a well ventilated place.

Further, as a magenta coloring matter excellent in clarity and light resistance, coloring matters having anthrapyridone skeleton as described in JP-A-59074173 (1984), JP-A-02016171 (1990) and the like are known, but they do not meet all requirements of hue, clarity, light resistance, water resistance, ozone resistance and a solution stability.

An object of the present invention is to provide a water-based magenta ink composition having a hue and clarity suitable for ink-jet recording and gives prints excellent in fastnesses such as a light resistance, and an ozone resistance.

SUMMARY OF THE INVENTION

The present inventors hardly researched for resolving the above problems. As the result, the present invention was completed. That is, the present invention relates to:

(1) an anthrapyridone compound represented by the formula (1):

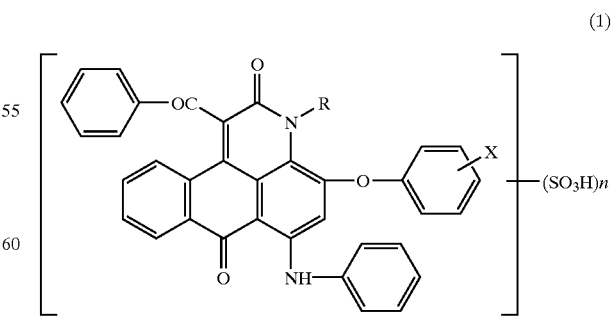

wherein R represents hydrogen atom or methyl group; X represents phenyl group, phenoxy group or halogen atom; and n is an integer of 1 to 4, or a salt thereof;

(2) the anthrapyridone compound as described in (1) wherein n is an integer of 2 to 4, or the salt thereof;

(3) the anthrapyridone compound as described in (2) wherein X represents phenyl group, or the salt thereof;

(4) an anthrapyridone compound represented by the formula (2):

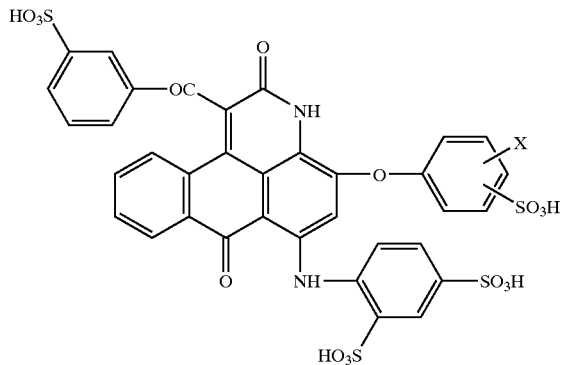

(2)

wherein X represents phenyl group, phenoxy group or halogen atom, or a salt thereof;

(5) an anthrapyridone compound represented by the formula (3):

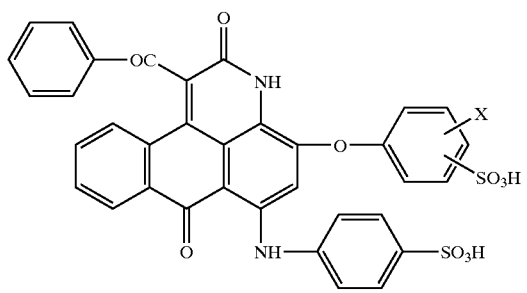

(3)

wherein X represents phenyl group, phenoxy group or halogen atom, or a salt thereof;

(6) an anthrapyridone compound represented by the formula (4):

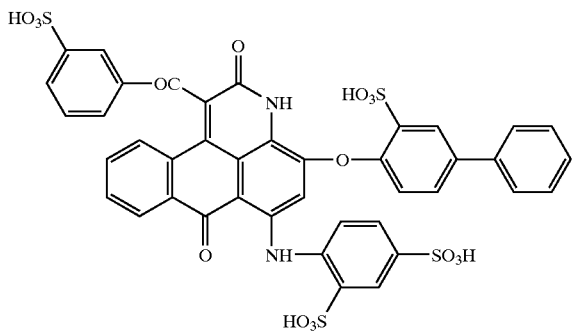

(4)

or a salt thereof;

(7) a water-based magenta ink composition comprising anthrapyridone compound as described in any one of (1) to (6) or a salt thereof;

(8) a water-based magenta ink composition as described in (7) comprising water and a water-soluble organic solvent;

(9) a water-based magenta ink composition as described in (7) or (8), wherein said composition is for ink-jet recording;

(10) an ink-jet recording method, which comprises using the water-based magenta ink composition as described in any one of (7) to (9) as the ink in the ink-jet recording way that ink droplets are jetted responding to recording signal to record on a recording material;

(11) an ink-jet recording method, which comprises using the water-based magenta ink composition as described in any one of (7) to (9) as the ink and a water-based cyan ink composition comprising a water-soluble metal phthalocyanine coloring matter as a cyan ink in the ink-jet recording way that ink droplets are jetted responding to recording signal to record on a recording material;

(12) an ink-jet recording method as described in (10) or (11) wherein the substrate to be recorded is a polyamide fibrous material and the fibrous material is heat treated after the ink composition is applied;

(13) an ink-jet recording method as described in (10) or (11) wherein the recording material is an information transmittance sheet;

(14) an ink-jet recording method as described in (13) wherein the information transmittance sheet is a surface treated sheet;

(15) an ink-jet printer in which a container containing a water-based magenta ink composition as defined in any one of (7) to (9) and a container containing a water-based cyan ink composition comprising a water-soluble metal phthalocyanine coloring matter are set.

DETAILED DESCRIPTION OF THE INVENTION

The present invention will be described in more detail.

The anthrapyridone compound of the formula (1) is obtained by, for example, the following method. That is, to 1 mole of the compound represented by the formula (6):

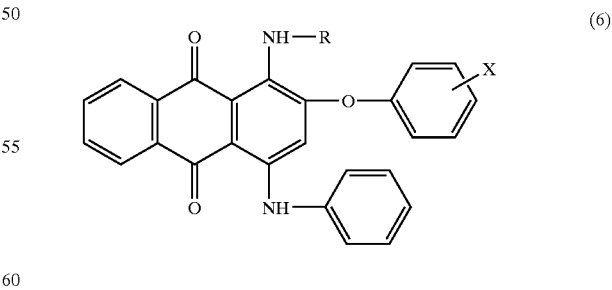

(6)

is added ethyl benzoylacetate generally in an amount of 1 to 3 moles and then they are heated in a solvent such as xylene in the presence of a catalytic amount of sodium carbonate or sodium carbonate anhydride at a temperature of generally 130 to 145° C. for a period of generally 2 to 10 hours, while water and ethanol produced are removed by azeotropic distillation with the solvent so that a ring closure is effected, thereby the compound of the formula (7):

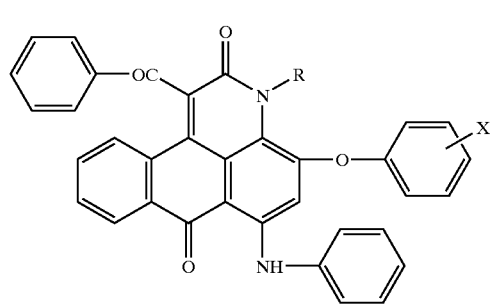

(7)

is obtained. Then, this compound of the formula (7) is added to fuming sulfuric acid having a concentration of generally 5 to 30% and sulfonated at a temperature of generally 5 to 100° C. for a period of generally 15 minutes to 10 hours, thereby the anthrapyridone compound of the formula (1) is obtained.

The novel anthrapyridone compound of the present invention is represented by the formula (1). Example of the substituent X on phenoxy group in the formula (1) includes p-phenyl, o-phenyl, p-phenoxy, p-chloro, o-chloro, p-bromo groups and the like.

Examples of the compound represented by the formula (2) of the present invention are set forth below:

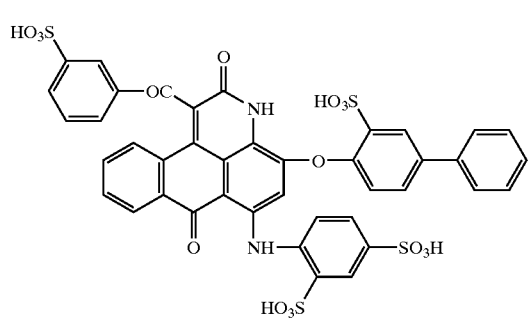

(4)

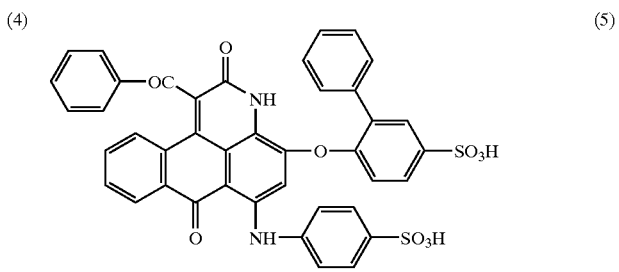

(5)

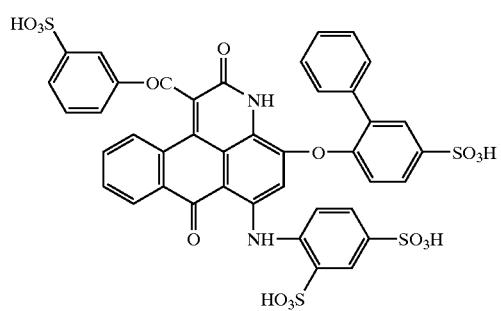

(12)

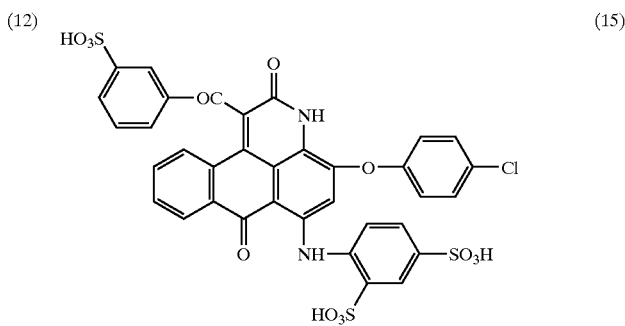

(15)

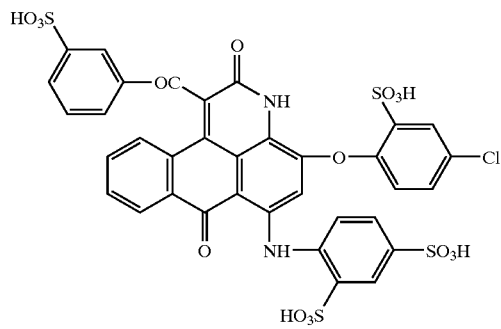

(16)

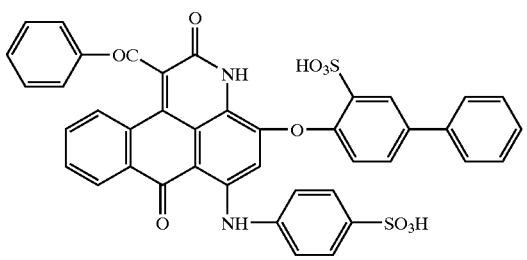

(17)

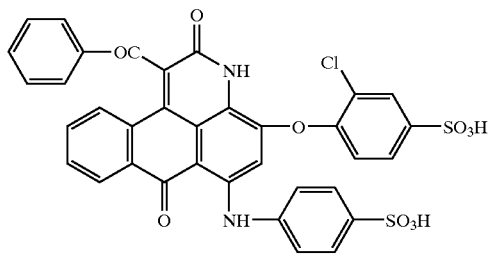

(18)

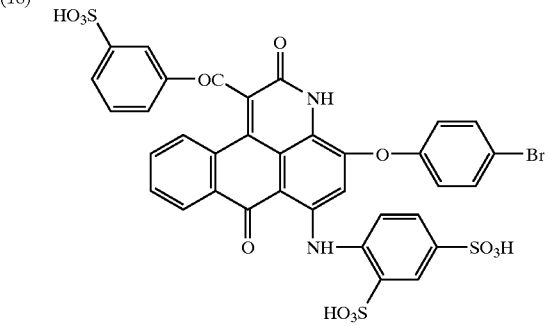

(19)

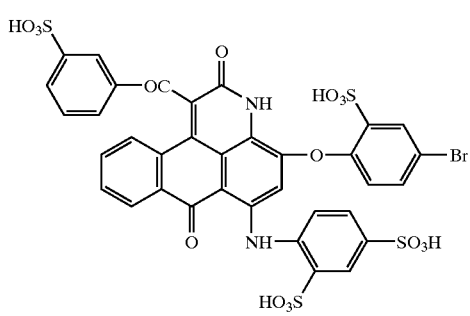

(20)

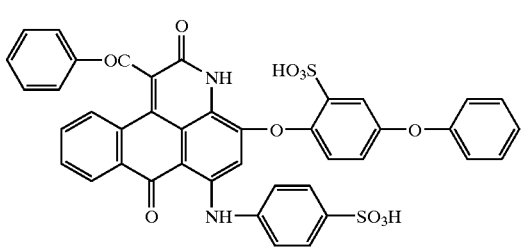

(21)

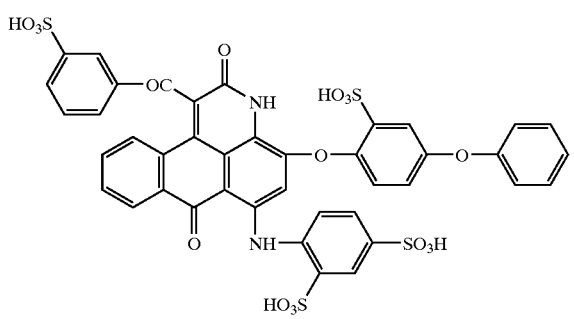

(22)

The present compound may be in the form of a free acid or a salt. The sulfonated product of the compound of the formula (2) can be used as a free acid or a salt such as an alkali metal salt, an alkaline earth metal salt, an alkylamine salt, an alkanolamine salt and an ammonium salt. Example of the preferable salt includes alkali metal salts such as sodium, potassium and lithium salts; ammonium salt; and alkanolamine salts such as monoethanolamine, diethanolamine, triethanolamine, monoisopropanolamine, diisopropanolamine and triisopropanolamine salts.

A salt of the sulfonated product of the compound of the formula (2) is prepared by, for example, the following method.

First, a sufonated reaction liquid is added into an iced water, to which sodium chloride is added to salt out and the reaction product is filtered, thereby a sodium salt of the sulfonated product of the compound of the formula (2) is obtained. Then, this sodium salt is dissolved in water and an acid is added to precipitate crystals. The crystals are filtered to obtain a coloring matter in a free acid form as a cake. Then, the coloring matter in a free acid form is dissolved or suspended in water, in which the amine or metal salt mentioned above is added and dissolved, thereby a desired salt of the sulfonated product of the compound of the formula (2) is obtained.

The water-based ink composition of the present invention is obtained by dissolving the above coloring matter component in water, or optionally mixture of water and water-soluble organic solvent. A pH of the resultant ink is preferably about 6 to 10. When the water-based ink composition is used in an ink-jet printer, the coloring matter containing a minor amount of inorganic substances such as chloride, sulfate and the like of metallic cations is preferably used. As a criterion of a total amount of inorganic substances, a total amount of sodium chloride and sodium sulfate of at most 1% by mass may be mentioned. In order to prepare the coloring matter component containing a minor amount of inorganic substances of the present invention, the coloring matter component of the present invention may be desalted according to a routine method using a reverse osmosis membrane, a method comprising dissolving the coloring matter component in the form of a dry product or a wet cake in a mixture of alcohol and water with stirring, filtering and drying, or the like.

The water-based ink composition of the present invention is formulated as a composition based on water. The coloring matter component of the present invention is contained in an amount of preferably about 0.1 to 20% by mass, more preferably about 1 to 10% by mass, even more preferably about 2 to 8% by mass in the water-based ink composition. Further, the water-based ink composition of the present invention may comprise 0 to 30% by mass of a water-soluble organic solvent and 0 to 5% by mass of ink additives.

The ink composition of the present invention is prepared by adding and mixing the above compound of the present invention and optionally a water-soluble organic solvent, ink additives or the like in water free from impurities such as a distilled water and the like. Alternatively, the compound of the present invention may be added and dissolved in a mixture of water, a water-soluble organic solvent, ink additives and the like. If necessary, impurities may be removed by filtering after the ink composition is prepared.

Example of the usable water-soluble organic solvent includes C1–C4 alkanols such as methanol, ethanol, propanol, isopropanol, butanol, isobutanol, sec-butanol, and tert-butanol; carboxamides such as N,N-dimethylformamide and N,N-dimethylacetamide; lactams such as N-methylpyrrolidin-2-one; cyclic ureas such as 1,3-dimethylimidazolidin-2-one and 1,3-dimethylhexahydro pyrimid-2-one; ketones or ketoalcohols such as acetone, methyl ethyl ketone, and 2-methyl-2-hydroxypentan-4-one; ethers such as tetrahydrofuran and dioxane; mono-, oligo- or poly-alkylene glycols or thioglycols having C2–C6 alkylene units such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol, and polypropylene glycol; polyols (triols) such as glycerol and hexane-1,2,6-triol; C1–C4 alkyl ethers of polyhydric alcohols such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; γ-butyrolactone; dimethyl sulfoxide; and the like. The water-soluble organic solvent may be used in mixture.

Effective water-soluble organic solvent includes N-methylpyrrolidin-2-on and mono-, di- or tri-alkylene glycol having C2–C6 alkylene units, preferably mono-, di- or tri-ethylene glycol, dipropylene glycol, dimethyl sulfoxide and the like, N-methylpyrrolidin-2-on, diethylene glycol and dimethyl sulfoxide are especially preferably used.

Example of ink additives includes an antiseptic and mildew-proofing agent, a pH controlling agent, a chelating agent, a rust preventive, a water-soluble UV absorber, a water-soluble polymeric compound, a dye solubilizing agent, a surfactant and the like. Example of an antiseptic and mildew-proofing agent includes sodium dehydroacetate, sodium sorbate, sodium 2-pyridinethiol-1-oxide, sodium benzoate, sodium pentachlorophenol and the like. As a pH controlling agent, any compound can be used as long as it does not affect an ink composition to be formulated and it can control a pH of an ink composition in the range of 6 to 11. Example thereof includes alkanolamines such as diethanolamine, and triethanolamine; alkali metal hydroxides such as lithium hydroxide, sodium hydroxide, and potassium hydroxide; ammonium hydroxide; alkali metal carbonates such as lithium carbonate, sodium carbonate, and potassium carbonate; and the like. Example of a chelating agent includes sodium ethylendiamine tetraacetate, sodium nitrilotriacetate, sodium hydroxyethyl ethylendiamine triacetate, sodium diethylene triaminepentacetate, sodium uramildiacetate and the like. Example of a rust preventive includes acid sulfite, sodium thiosulfate, ammonium thioglycolate, diisopropylammonium nitrite, pentaerythritol tetranitrate, dicyclohexylammonium nitrite and the like. Example of a water-soluble polymeric compound includes polyvinyl alcohol, a cellulose derivative, polyamine, polyimine and the like. Example of a water-soluble UV absorber includes sulfonated benzophenone, sulfonated benzotriazole and the like. Example of a dye solubilizing agent includes ε-caprolactam, ethylene carbonate, urea and the like. Example of a surfactant includes known surfactants of anionic, cationic or nonionic type.

Example of a recording material applicable to the ink-jet recording method of the present invention includes information transmission sheet such as papers and films, fibers, leathers and the like. Preferable information transmission sheets are surface treated sheets, specifically sheets having ink receiving layers on the above substrates. The ink receiving layer is provided by immersing a cationic polymer in the substrate or coating the substrate with a cationic polymer, or applying inorganic fine particles capable of adsorbing a color in an ink such as a porous silica, an alumina sol, and a specific ceramic together with a hydrophilic polymer such as polyvinyl alcohol, polyvinyl pyrrolidone and the like on a surface of the substrate. A sheet having an ink receiving layer is generally called as ink-jet exclusive papers (films) or glossy papers (films). For example, these sheets are commercially available as Pictorico (Asahi Glass Co., Ltd.), Color BJ Paper and Color BJ Photo film sheet (both Canon Inc.), Color Image Jet Paper (Sharp Corporation), Superfine exclusive glossy film (Epson Corporation), Pictafine (Hitachi Maxell, Ltd.) and the like. Of course, the ink-jet recording method of the present invention can be applied to plain papers.

The fibers are preferably polyamide fibers such as nylon, silk, and wool. Woven or non-woven fabric is preferable. The ink composition of the present invention is applied to the fibers preferably by an ink-jet recording method and then fixed under a wet heat condition (for example, about 80 to 120° C.) or a dry heat condition (for example, about 150 to 180° C.) so that the color can be fixed within the fibers. The thus-dyed product is excellent in clarity, light resistance and laundry resistance.

In order to record on a recording material by the ink-jet recording method of the present invention, for example a container containing the above water-based magenta ink composition may be set (filled up) in an ink-jet printer and then the recording may be made on the substrate according to the conventional method. Example of an ink-jet printer includes a piezo-type printer where a mechanical vibration is employed, a bubble jet (R) type printer where bubbles produced by heating is employed; and the like.

In the ink-jet recording method of the present invention, the water-based magenta ink composition of the present invention may be combined with a yellow ink composition, a cyan ink composition and optionally a black ink composition. When a water-based cyan ink composition comprising a water-soluble metal phthalocyanine color is used as a cyan ink composition, a change in color tone before and after a light resistance test becomes small by combining it with the water-based magenta ink composition of the present invention. Example of a metal in a water-soluble metal phthalocyanine coloring matter includes cupper, nickel, aluminum and the like, among which cupper is preferable. Example of a water-soluble cupper phthalocyanine coloring matter includes C.I. Direct Blue 86, C.I. Direct Blue 87, C.I. Direct Blue 199, C.I. Acid Blue 249, C.I. Reactive Blue 7, C.I. Reactive Blue 15, C.I. Reactive Blue 21, C.I. Reactive Blue 71 and the like.

A water-based cyan ink composition comprising a water-soluble metal phthalocyanine coloring matter is, for example, prepared according to the method of preparing the water-based magenta ink composition of the present invention and poured into a container, and the container is set in a predetermined position in an ink-jet printer similarly to the container containing the water-based magenta ink composition of the present invention.

The water-based ink composition of the present invention has a clear magenta color, for which a color tone over a wide visible light range can be obtained by using it together with other yellow and cyan inks. By using together with yellow, cyanine and black inks excellent in ozone resistance, light resistance and water resistance, prints excellent in light resistance, water resistance and especially ozone resistance can be obtained.

EXAMPLES

The present invention will be described by referring to the following examples. All parts and percentages referred to herein are by weight unless otherwise indicated.

Example 1

(1) Into 210 parts of xylene, 67.5 parts of the compound of the formula (8):

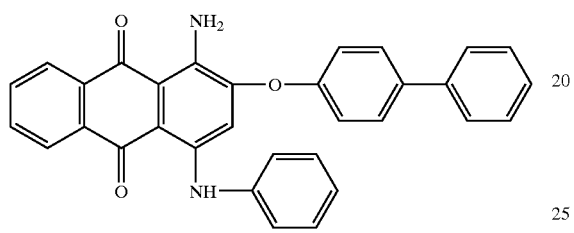

(8)

1.4 part of sodium carbonate and 67.2 parts of ethyl benzoylacetate were successively charged and heated. They were reacted at a temperature of 140 to 143° C. for 4 hours, while water and ethanol produced were distilled away together with xylene. After the reaction was completed, the resultant product was cooled with water, to which 175 parts of methanol was added, stirred for 30 minutes, filtered, washed with 400 parts of methanol and hot water successively and dried, thereby 76.1 parts of the compound of the formula (9) was obtained as needle-like crystals of a red color.

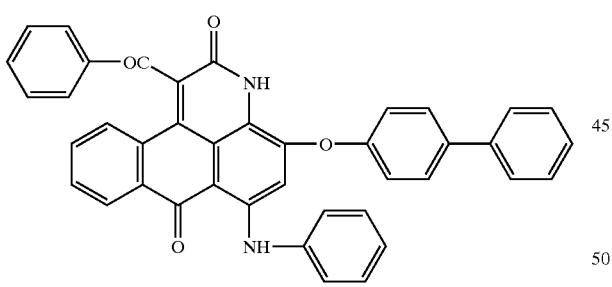

(9)

(2) To 142.3 parts of 96.6% sulfuric acid was added 207.7 parts of 30.6% fuming sulfuric acid while cooling with an iced water to prepare 350 parts of 12% fuming sulfuric acid. Then, 42.7 parts of the compound of the formula (9) obtained in the above (1) was added to fuming sulfuric acid at 20 to 40° C. over 30 minutes. Then, they were heated at 60 to 70° C. for two hours with stirring to complete the sulfonation. Next, the above reaction liquid was added in an iced water in such an amount that a total liquid volume was 1000 parts. The reaction was filtered to remove a minor amount of insoluble matter. 200 parts of sodium chloride was added to the mother liquid while stirring and they were stirred for one hour. The resultant precipitates were filtered and washed with 50 parts of a water-based 20% brine solution to obtain a wet cake.

This cake was again stirred with water in such an amount that a total liquid volume was 1000 parts. 200 parts of sodium chloride was added to the liquid and then stirred for 3 hours. The resultant precipitates were filtered, washed with 100 parts of a water-based 20% brine solution and dried, thereby 65.0 parts of a sodium salt of the compound of the formula (4) as crystals of a bright red color.

$\lambda_{max}$=528.2 nm (in aqueous solution)

solubility in water=100 g/L or higher

Example 2

(1) Into 180 parts of xylene, 43.4 parts of the compound of the formula (10):

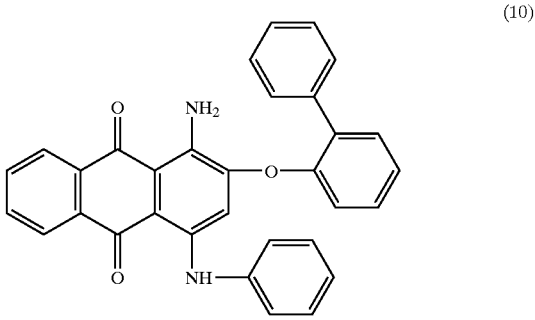

(10)

0.9 part of sodium carbonate and 43.3 parts of ethyl benzoylacetate were successively charged and heated. They were reacted at a temperature of 138 to 141° C. for 6 hours, while water and ethanol produced were distilled away together with xylene. After the reaction was completed, the resultant product was cooled with water, to which 200 parts of methanol was added, stirred for 30 minutes, filtered, washed with 250 parts of methanol and hot water successively and dried, thereby 50.3 parts of the compound of the formula (11) was obtained as needle-like crystals of a yellowish red color.

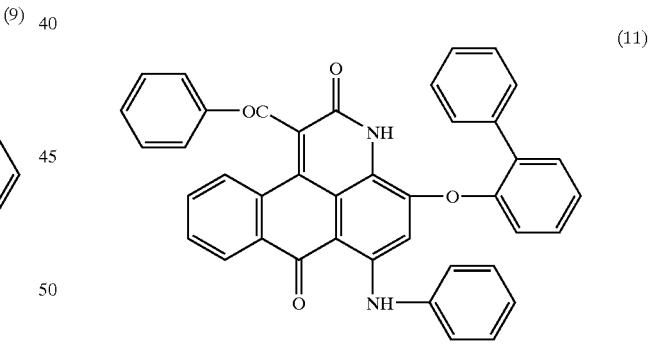

(11)

(2) To 52.9 parts of 96.6% sulfuric acid was added 47.1 parts of 31.7% fuming sulfuric acid while cooling with an iced water to prepare 100 parts of 6.5% fuming sulfuric acid. Then, 12.2 parts of the compound of the formula (11) obtained in the above (1) was added to the fuming sulfuric acid at 15 to 20° C. over one hour. Then, they were heated at 15 to 20° C. for two hours with stirring to complete the sulfonation. Next, the above reaction liquid was added in an iced water in such an amount that a total liquid volume was 450 parts. The aqueous liquid was heated, to which 48 parts of sodium chloride was added with stirring at about 60° C. and they were stirred for one hour. The resultant precipitates were filtered and washed with 50 parts of an aqueous 20% brine solution to obtain a wet cake.

This cake was again stirred with water in such an amount that a total liquid volume was 300 parts. After a minor amount of insoluble matter was removed by filtering, 52.5 parts of sodium chloride was added to the mother liquid while stirring and then stirred for 30 minutes to precipitate crystals. Further, 17.5 parts of sodium chloride was added and stirred for 30 minutes. The resultant precipitates were filtered, washed with 50 parts of an aqueous 20% brine solution to obtain 32 parts of a sodium salt of the compound of the formula (5) as a wet cake.

(3) The wet cake obtained in the above (2) was stirred with 250 parts of methanol at room temperature for 30 minutes, filtered, washed with 200 parts of methanol and dried, thereby 13.3 parts of the compound of the formula (5) was obtained as crystals of a bright yellowish red color.

$\lambda_{max}$=531.0 nm (in aqueous solution)

solubility in water=100 g/L or higher

Example 3

To 46.3 parts of 96.6% sulfuric acid was added 53.7 parts of 31.7% fuming sulfuric acid while cooling with an iced water to prepare 100 parts of 10% fuming sulfuric acid. Then, 9.2 parts of the compound of the formula (11) obtained in Example 2-(1) was added to the fuming sulfuric acid at room temperature over about 30 minutes. Then, they were heated and reacted at 25 to 30° C. for 1.5 hours. Successively they were heated and reacted at 60 to 70° C. for 1.5 hours to complete the sulfonation. Next, the above reaction liquid was added in an iced water in such an amount that a total liquid volume was 300 parts. 60 parts of sodium chloride was added to the aqueous liquid and they were stirred for one hour. 600 parts of methanol was added to the aqueous solution to precipitate crystals. After stirring for one hour, the precipitates were filtered, washed with 300 parts of methanol and dried, thereby the compound of the formula (12) was obtained as crystals of a red color.

$\lambda_{max}$=529.6 nm (in aqueous solution)

solubility in water=100 g/L or higher

Example 4

(1) Into 100 parts of xylene, 26.4 parts of the compound of the formula (13):

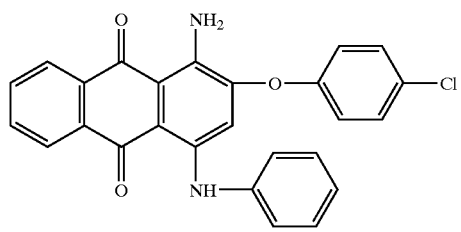

(13)

0.6 part of sodium carbonate and 28.8 parts of ethyl benzoylacetate were successively charged and heated. They were reacted at a temperature of 140 to 143° C. for 4 hours, while water and ethanol produced were distilled away together with xylene. After the reaction was completed, the resultant product was cooled with water, to which 150 parts of methanol was added, stirred for 30 minutes, filtered, washed with 200 parts of methanol and hot water successively and dried, thereby 33.2 parts of the compound of the formula (14) was obtained as needle-like crystals of a red color.

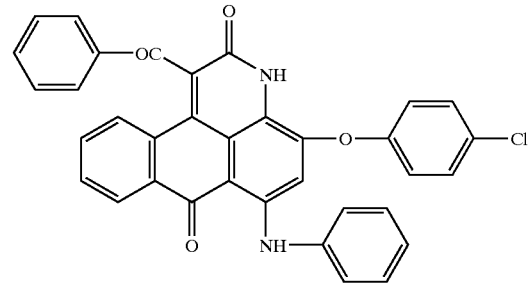

(14)

(2) To 39.7 parts of 96.6% sulfuric acid was added 35.3 parts of 31.7% fuming sulfuric acid while cooling with an iced water to prepare 75 parts of 6.5% fuming sulfuric acid. To fuming sulfuric acid under cooling with ice, 8.5 parts of the compound of the formula (14) obtained in the above (1) was added at 15 to 20° C. over 15 minutes. Then, they were reacted at 50 to 60° C. for 2 hours and successively at 70 to 80° C. for 2 hours. Next, the above reaction liquid was added in an iced water in such an amount that a total liquid volume was 300 parts. 45 parts of sodium chloride was added to the aqueous liquid with stirring at room temperature and they were stirred for one hour. The resultant precipitates were filtered, washed with 50 parts of an aqueous 20% brine solution and dried, thereby 11 parts of red crystals comprising the mixture of 8.8 parts of the compound of the formula (15) and 2.2 parts of the compound of the formula (16).

$\lambda_{max}$=527.8 nm (in aqueous solution)

solubility in water=100 g/L or higher

Example 5

(A) Preparation of Ink

A mixture having a composition as shown in the following Table 1 was prepared. This mixture was filtered through a membrane filter of 0.45 μm, thereby an aqueous ink composition for ink-jet recording of the present invention having a pH of 8 to 10 was obtained.

TABLE 1

| Composition | amount (parts) |
|---|---|
| coloring matter obtained in Ex. 1 | 3.0 |
| water + ammonium hydroxide | 78.0 |
| glycerol | 5.0 |
| urea | 5.0 |
| N-methyl-2-pyrrolidone | 4.0 |
| IPA | 3.0 |
| butyl carbitol | 2.0 |
| total | 100.0 |

(Comparative Compositions)

For comparison, magenta ink compositions of Comparative Examples 1 and 2 were prepared by using C.I. Acid Red 82 (Comparative Example 1) and C.I. Direct Red 227 (Comparative Example 2) and applying the composition ratio as shown in Table 1 so that each of the resultant compositions had an optical density identical with that of the water-based magenta ink composition of the present invention.

(B) Ink Jet Printing

Using an ink-jet printer (trade name: PICTY 100L, NEC Corporation), an ink-jet recording was made on a commercially available exclusive paper (PR-101 of Canon Inc.) and a commercially available exclusive paper (PM photographic paper of Epson Corporation).

(C) Evaluation of Recorded Images

Hue (L*, a* and b* values) and color difference (ΔE*ab) before and after each test of the recorded images were determined using a colorimeter (GRETAG SPM 50 of GRETAG). Clarity (C*) of the recorded images was evaluated according to the following equation:

$$C^* = ((a^*)^2 + (b^*)^2)^{1/2}$$

(i) Light Resistance Test

The resultant print was exposed for 20 hours using a carbon arc fade meter (Suga Test Instruments Co., Ltd.). A change before and after the exposure was judged in accordance with JIS blue scale. Simultaneously, a color difference before and after the exposure was determined using the above calorimeter.

(ii) Ozone Resistance Test

The resultant print was treated under conditions of a concentration of 4 ppm and a temperature of 40° C. for 20 hours using an ozone weather meter (Suga Test Instruments Co., Ltd.). A color difference before and after the treatment was determined using the above calorimeter.

The results of the recorded images with respect to hue, clarity, difference in clarity (ΔC*), light resistance test and ozone resistance test are shown in Table 1. The difference in clarity (ΔC*) is a value with reference to the hue resulting from the magenta ink composition of the present invention.

The evaluation results of the images recorded on the exclusive paper (PR-101 of Canon Inc.) are shown in Table 2. The evaluation results of the images recorded on the exclusive paper (PM photographic paper of Epson Corporation) are shown in Table 3.

In the following tables, M1 represents the ink composition of Example 5, M2 represents the ink composition of Comparative Example 1 and M3 represents the ink composition of Comparative Example 2.

TABLE 2

Evaluation results on exclusive paper (PR-101 of Canon Inc.)

| | hue | | | clarity | | ozone resistance | light resistance | |
|---|---|---|---|---|---|---|---|---|
| | L* | a* | b* | C* | ΔC* | ΔE*ab | judgement | ΔE*ab |
| M1 | 53.6 | 76.4 | −3.26 | 76.5 | ref | 1.13 | 3–4 Grade | 8.4 |
| M2 | 54.1 | 73.5 | 3.47 | 73.6 | −3.8 | 13.80 | 4 Grade | 3.4 |
| M3 | 54.8 | 75.3 | −4.63 | 74.5 | −2.0 | 12.00 | 2 Grade | 33.9 |

TABLE 3

Evaluation results on exclusive paper (PM photographic paper of Epson Corporation)

| | hue | | | clarity | | ozone resistance | light resistance | |
|---|---|---|---|---|---|---|---|---|
| | L* | a* | b* | C* | ΔC* | ΔE*ab | judgement | ΔE*ab |
| M1 | 53.8 | 77.1 | −4.95 | 77.3 | ref | 2.82 | 3–4 Grade | 9.6 |
| M2 | 54.7 | 73.3 | −0.56 | 73.3 | −4.0 | 11.21 | 4 Grade | 2.9 |
| M3 | 51.3 | 75.8 | −10.74 | 76.5 | −0.8 | 14.32 | 2 Grade | 47.8 |

As clear from Tables 2 and 3, the magenta ink composition of the present invention is superior, especially in ozone resistance, as compared with the magenta ink compositions of Comparative Examples 1 and 2. Thus, the magenta ink composition of the present invention is very useful as a magenta ink giving prints excellent in long-period storage since prints resulting from the use of the magenta ink composition of the present invention are hardly affected by light and components such as gases contained in an air even if they are stored or displayed for a long period.

As clear from Tables 2 and 3, the ink composition of the present invention has an almost ideal magenta color as compared with C.I. Acid Red 82 of the anthrapyridone color used in Comparative Example 1 since it gives a clear purple color having a good hue and clarity. And, it can be said that the ink composition of the present invention is very superior ink composition since C* value is higher and clarity is better.

As clear from Tables 2 and 3, the ink composition of the present invention has higher light resistance as compared with C.I. Direct Red 227 of Comparative Example 2 which is presently used as a magenta component in ink-jet inks. Therefore, prints resulting from the use of the ink composition of the present invention can be stored for a long period. Since the compound of the present invention has a solubility in water of 100 g/L or higher, it is very excellent as a coloring matter for ink-jet recording and an ink with a high concentration can be prepared.

Effect of the Invention

The anthrapyridone compound and the magenta ink composition containing it according to the present invention have characteristic that they have a high solubility in water so that they are satisfactorily filtered through a membrane filter during the preparation of an ink composition. And, the anthrapyridone compound is very safe for living body. Further, the ink composition of the present invention has good storage stability and therefore, it does not cause precipitation, change in physiological properties, color change and the like even after stored for a long period. Since prints resulting from the use of the ink composition of the present invention as a magenta ink for ink-jet recording is excellent in light resistance, moisture resistance and especially ozone resistance, it is possible to use together with yellow, cyan and black colors so that each color excellent in ozone resistance, light resistance and water resistance can be obtained by an ink-jet recording method. Especially this advantage is remarkably exhibited on a recording paper having an ink receiving layer. In addition, the resultant printed surface has a clear magenta color close to an ideal magenta color so that a color tone over a wide visible light range can be obtained by combining with other yellow and cyan inks. Accordingly, the anthrapyridone compound of the present invention is very useful as a color in a magenta ink for ink-jet recording.

What is claimed is:

1. An anthrapyridone compound represented by the formula (1):

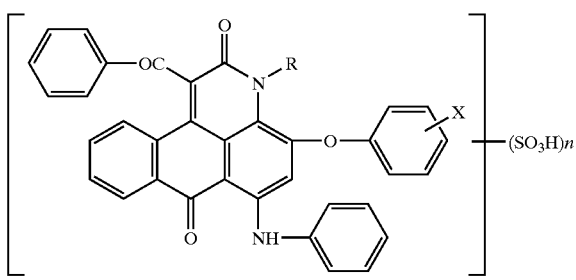

(1)

wherein R represents hydrogen atom or methyl group; X represents phenyl group, phenoxy group or halogen atom; and n is an integer of 1 to 4, or a salt thereof.

2. The anthrapyridone according to claim 1, wherein n is an integer of 2 to 4, or the salt thereof.

3. The anthrapyridone compound according to claim 2, wherein X represents phenyl group, or the salt thereof.

4. An anthrapyridone compound represented by the formula (2):

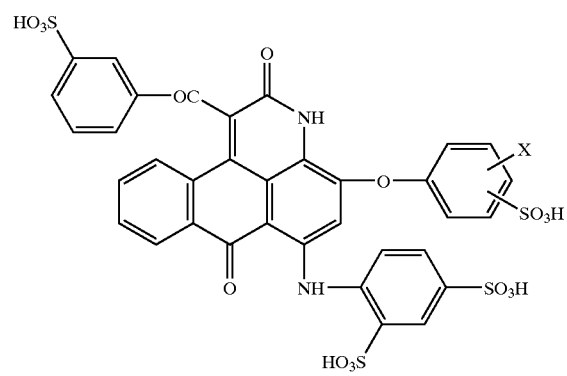

(2)

wherein X represents phenyl group, phenoxy group or halogen atom, or a salt thereof.

5. An anthrapyridone compound represented by the formula (3):

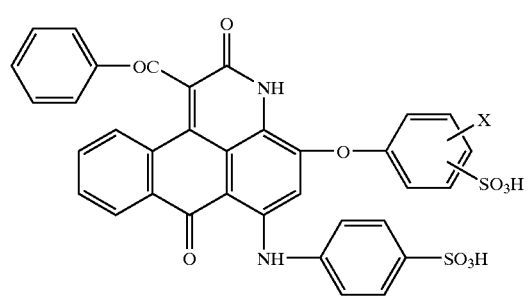

(3)

wherein X represents phenyl group, phenoxy group or halogen atom, or a salt thereof.

6. An anthrapyridone compound represented by the formula (4):

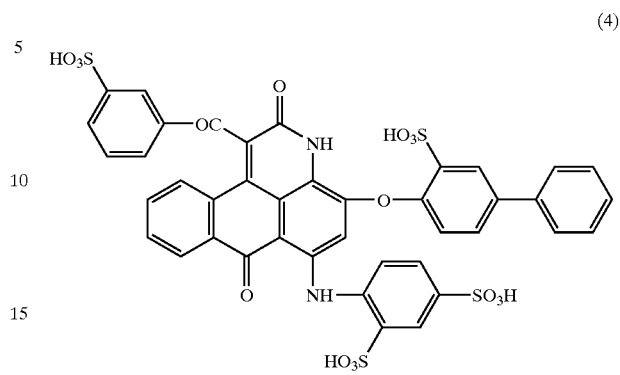

(4)

or a salt thereof.

7. A water-based magenta ink composition comprising the anthrapyridone compound as defined in any one of claims 1 to 6, or the salt thereof.

8. The water-based magenta ink composition according to claim 7 comprising water and a water-soluble organic solvent.

9. A water-based magenta ink composition according to claim 7 or 8, wherein said composition is for ink-jet recording.

10. An ink-jet recording method, comprising jetting droplets of ink responding to a recording signal to record on a recording material wherein the ink comprise the water-based magenta ink composition according to any one of claims 7 to 9.

11. An ink-jet recording method, comprising jetting droplets of ink set responding to a recording signal to record on a recording material wherein the ink set comprises the water-based magenta ink composition according to any one of claims 7 to 9 and a water-based cyan ink composition comprising a water-soluble metal phthalocyanine coloring matter.

12. An ink-jet recording method as defined in claim 10 or 11 wherein the substrate to be recorded is a polyamide fibrous material and the fibrous material is heat treated after the ink composition is applied.

13. An ink-jet recording method according to claim 10 or 11 wherein the recording material is an information transmittance sheet.

14. An ink-jet recording method according to claim 13 wherein the information transmittance sheet is a surface treated sheet.

15. An ink-jet printer comprising a container containing a water-based magenta ink composition according to any one of claims 7 to 9 and a container containing a water-based cyan ink composition comprising a water-soluble metal phthalocyanine coloring matter as an ink set.

* * * * *